H. K. GILMAN.
GUITAR PICK.
APPLICATION FILED FEB. 6, 1918.
1,296,284. Patented Mar. 4, 1919.
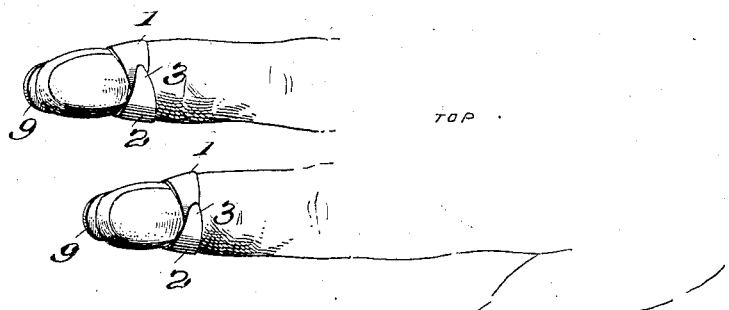
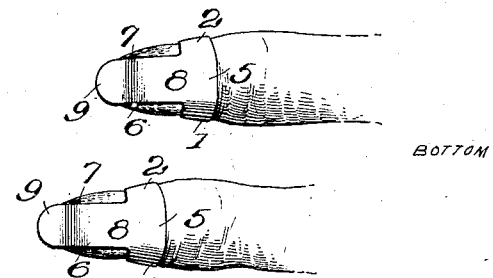
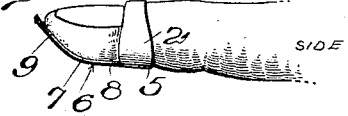
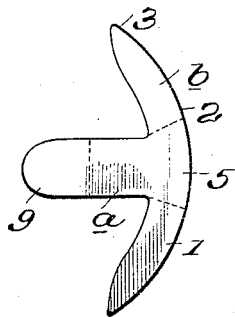
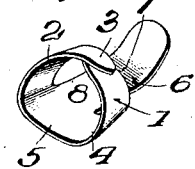
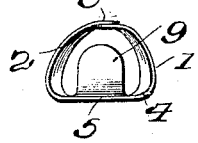
Inventor
H. K. Gilman.
By Lacey & Lacey, Attorneys

UNITED STATES PATENT OFFICE.

HARRY K. GILMAN, OF WASHINGTON, DISTRICT OF COLUMBIA.

GUITAR-PICK.

1,296,284. Specification of Letters Patent. Patented Mar. 4, 1919.

Application filed February 6, 1918. Serial No. 215,638.

*To all whom it may concern:*

Be it known that I, HARRY K. GILMAN, a citizen of the United States, residing at Washington, District of Columbia, have invented certain new and useful Improvements in Guitar-Picks, of which the following is a specification.

This invention relates to picks for use in the playing of stringed musical instruments and the primary aim of the invention is to provide a pick especially adapted for use in the playing of a guitar, and while the pick is to be employed usually in the playing of this instrument to produce music greatly resembling Hawaiian music as played upon the musical instrument known as the ukulele, the pick also possesses features which render it highly desirable for use in ordinary guitar playing. A great disadvantage attending the use of previously designed picks constructed to fit the fingers is that in twanging the strings of the instrument the pick is liable to slip upon the finger or be pulled bodily therefrom. The present invention therefore has as one of its principal objects to provide a pick so constructed that the picking tongue thereof will snugly and accurately fit the ball of the finger and will be of such conformation as to absolutely preclude any likelihood of the pick becoming displaced upon the finger or pulled from the finger.

I am, of course, aware of the fact that there are previously-designed picks which include finger encircling ring portions or members which may be expanded to fit fingers of different sizes or the different fingers of a hand. However, it is customary to form such ring members of cylindrical or substantially cylindrical shape and thus, while they may expand to adapt themselves to fingers of different sizes, they neither comfortably nor properly fit the finger to which they are applied. The present invention therefore has as a further aim to provide an article of the class described in which the finger encircling ring portion will be of a shape to accommodate the taper of the end of the finger and will, therefore, comfortably and accurately fit the finger even if considerably expanded or contracted.

In the accompanying drawings:

Figure 1 is a top plan view of two of the picks embodying the present invention applied to the fore and middle fingers of a hand;

Fig. 2 is a similar view but looking at the under sides of the picks;

Fig. 3 is a side elevation of one of the picks applied;

Fig. 4 is a perspective view of one of the picks;

Fig. 5 is an inner end elevation of one of the picks;

Fig. 6 is a plan view of the blank from which the pick is formed.

The pick embodying the present invention is formed from a blank of sheet metal or any other material possessing the desired degree of stiffness and resiliency and which blank is substantially of the form shown in Fig. 6 of the drawings. The blank comprises a body portion $a$ the lateral edges of which are parallel and the end edge of which is substantially semicircular, the said body being provided at its other end with laterally extending arms $b$ which are curved in the general direction of the first-mentioned end of the body and which are tapered in the direction of their extremities. In forming up the blank the same is to be bent along the dotted lines shown in Fig. 6, the arms $b$ between their points of juncture with the body $a$ and their extremities being bent along curved lines so as to form the finger encircling ring portion or member heretofore referred to. Referring now to the finished article, the finger-encircling ring portion is indicated in general by the numeral 1 and the same is, as stated above, formed by arms, which are indicated by the numeral 2, which arms are bent approximately upon the arcs of circles throughout their length so that their tapered ends, indicated by the numeral 3, will overlap as most clearly shown in Figs. 1, 4 and 5 of the drawings. As before stated the arms at their points of juncture with the body $a$ are to be bent and these bends are indicated in the drawings by the numeral 4, and as the lines along which the bends are formed diverge in the direction of the inner end of the pick as a whole, it is evident that the ring portion 1 will be of greater diameter at its inner end than at its outer end and will therefore be tapered in a forward direction so as to adapt it to conform to the taper of the finger to which it is to be applied. While as stated above the arms 2 are bent substantially on arcs and substantially throughout their lengths, that end of the body $a$ of the pick which lies between the bends 4 and which is indicated by the numeral 5, is preferably left flat or plane. It will be understood, of course, that even when the ring member 1 is considerably expanded or contracted, it will still retain its tapered form and consequently will accurately and snugly fit fingers of various sizes.

That portion of the device which is formed from the body $a$ of the blank shown in Fig. 6 comprises the picking tongue of the device and this tongue, which is indicated in general by the numeral 6, is bent along a transverse line as indicated by dots in Fig. 6 of the drawings, and as indicated by the numeral 7 in the other figures, so as to provide an inner portion 8 and an outer portion 9. The portions 8 and 9 are substantially flat throughout their lengths, the portion 8 occupying the same plane as the portion 5 of the finger encircling ring member 4 as will be apparent by reference to Figs. 3 and 4 of the drawings. By forming the bend 7, the portions 8 and 9 occupy planes at an obtuse angle to each other and it will be understood that except for the obtuse bend 7, the picking tongue is flat throughout its entire length.

Due to the peculiar form given the picking tongue 6, the forward portion 9 of the said tongue will fit flat and snugly against the under side of the end of the finger, as clearly shown in Fig. 3 of the drawings, and it will also be understood that due to the peculiar conformation of the picking tongue, the string engaging surface thereof will be entirely free from projections which would be likely to catch in the strings of the instrument and result in the pick being pulled from the finger. Furthermore it will be apparent that when the pick has been fitted onto the finger in the position illustrated in Fig. 3 of the drawings, it will maintain this position as the engagement of the portion 9 of the picking tongue against the end of the ball of the finger will effectually prevent the pick being slid farther back upon the finger, and the finger engaging ring member 1 will sufficiently snugly bind the finger to prevent forward or outward displacement of the pick.

Having thus described the invention, what is claimed as new is:

A guitar pick comprising a finger ring, and a picking tongue extending therefrom, the said tongue being formed between its ends with a well defined transverse bend and from the bend to its extremity having its picking face flat and unobstructed.

In testimony whereof I affix my signature.

HARRY K. GILMAN. [L. S.]